United States Patent [19]

Fey et al.

[11] 4,061,492

[45] Dec. 6, 1977

[54] METHOD OF ORE REDUCTION WITH AN ARC HEATER

[75] Inventors: Maurice G. Fey, Pittsburgh, Pa.; Edna A. Dancy, Beaconsfield, Canada

[73] Assignee: Westinghouse Electric Corporation, Pittsburgh, Pa.

[21] Appl. No.: 699,297

[22] Filed: June 23, 1976

Related U.S. Application Data

[63] Continuation of Ser. No. 553,401, Feb. 26, 1975, abandoned.

[51] Int. Cl.² .............................................. C21C 5/52
[52] U.S. Cl. ...................................... 75/10 R; 75/11; 75/38; 75/130.5; 75/133.5
[58] Field of Search .................. 75/11, 26, 12, 13, 38, 75/130.5, 133, 133.5, 10 R

[56] References Cited

U.S. PATENT DOCUMENTS

| | | | |
|---|---|---|---|
| 3,140,168 | 7/1964 | Halley et al. | 75/40 |
| 3,862,834 | 1/1975 | Von Waclawiczek et al. | 75/11 |

*Primary Examiner*—M. J. Andrews
*Attorney, Agent, or Firm*—L. P. Johns

[57] ABSTRACT

A two-stage process for converting metal-bearing ore to a metal or an alloy characterized by the steps of, first, partially reducing an ore having a relatively higher valence state to an intermediate product of a lower valence and, second, treating the intermediate product in an arc heater having a carbon-bearing reductant atmosphere in an amount in excess of that required to reduce the intermediate product to the metal form, whereby to produce a substantially pure metal or an alloy, such as ferrochromium, and an unused excess reducing gas or derivative thereof which are recirculated to the first step to assist in the partial reduction.

5 Claims, 5 Drawing Figures

METHOD OF ORE REDUCTION WITH AN ARC HEATER

This is a continuation of application Ser. No. 553,401, filed Feb. 26, 1975, now abandoned.

CROSS REFERENCE TO RELATED APPLICATION

This invention is related to the copending application of Maurice G. Fey entitled "Process for Reduction of Complex Metallic Ores," Ser. No. 553,404, filed Feb. 26, 1975, now U.S. Pat. No. 3,997,333.

BACKGROUND OF THE INVENTION

1. Field of the Invention

This invention relates to a process for refining metal ore containing at least one metal oxide. More particularly, it pertains to the direct conversion of an ore to a metal or an alloy by a continuous procedure involving two reducing steps in series.

2. Description of the Prior Art

The application of plasma technology to high temperature processes in the organic, inorganic, and extractive metallurgy areas has been widely researched. Previous investigations have included the plasma production of the acetylene and other hydrocarbons, nitrogen fixation, the production of oxides, carbides, and nitrides, the reduction of metal oxides and halides, benefication of complex minerals, and plasma remelting and refining. An example of a method and arc heater is shown in U.S. Pat. No. 3,765,870, entitled "Method of Direct Ore Reduction Using a Short Gap Arc Heater," by Maurice G. Fey and George A. Kemeny, issued Oct. 16, 1973. Other examples of similar processes are disclosed in that patent.

Despite extensive research, there are relatively few large scale commercial processes based on plasma technology. In general, those commercial processes have been confined to processes requiring temperatures not attainable by a conventional technique, to applications in which reduced capital requirements were of importance, or to processes where the plasma method resulted in a product with unique characteristics. In most cases, the plasma route has not been economically competitive because of higher energy costs. However, the situation is changing due to the shrinking supplies of light hydrocarbon fuels and to the development of a stable electric energy economy.

More specifically, heretofore the electrical requirements for an arc heater operated to reduce ores or oxides of most metals including iron, chromium, manganese and vanadium have not been economically feasible. Inasmuch as the power requirement of an arc heater for an ore reduction process are the primary operating costs, it is necessary that such costs be minimized wherever possible.

SUMMARY OF THE INVENTION

In accordance with this invention it has been found that the conditions for the use of an arc heater for the reduction of metal ores and oxides may be greatly improved by a process comprising the steps of (a) partially reducing at least one metallic oxide in a gas-solid reactor, such as a fluidized bed, by taking a metal ore from a relatively higher valence state to a lower valence state, and (b) treating the partially reduced metallic oxide ore and compounds in an arc heater in a reducing gas atmosphere, such as methane, in an amount in excess of that required to reduce the metallic oxides and compounds to the metal, whereby to produce a substantially pure metal and the unused excess reducing gas or derivatives thereof being recirculated to step (a) to assist in the preheating and partial reduction of the incoming metal oxide.

The advantage of the process of this invention is that the exhaust gases for an arc heater are used to prereduce and preheat ore, thus reducing the electrical requirements for an arc heater reduction process. The fluidized bed reactor used in series with an arc heater is the preferred device for prereduction and preheating of the ore.

DESCRIPTION OF THE PREFERRED EMBODIMENT

Figure 1:
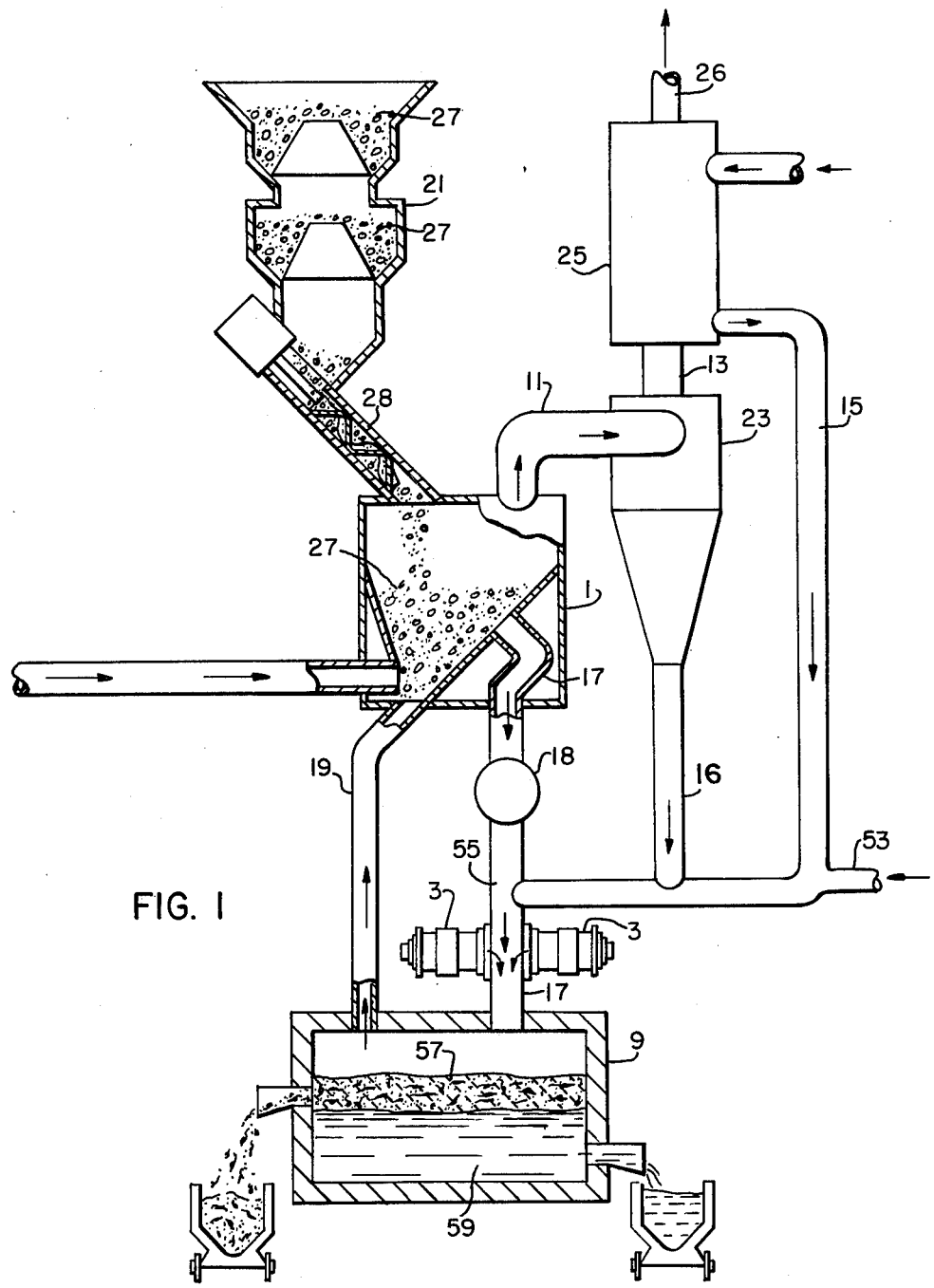
FIG. 1 is a diagrammatic view showing a two-step benefication process for the direct reduction of a metallic ore to the state of a pure metal, or ferroalloy.

The method of this invention involves a process for the direct reduction of an ore to a pure metal or ferroalloy. Basically, the process comprises a two-step procedure including the steps of a. partially reducing an ore containing at least one metallic oxide and other metallic compounds in a gas-solid reactor, and b. treating the partially reduced metallic oxides in an arc heater in an atmosphere of a reducing gas in an amount in excess of that required to reduce the metallic oxides and compounds to the metal, whereby to produce a substantially pure metal and the unused excess reducing gas or derivatives thereof being recirculated to step (a) to effect the partial reduction The process of this invention may be used for the reduction of ore of a metal comprising at least one oxide of a metal, and is preferably used for the reduction of metals in Group Numbers for the 5b, 6b, 7b, and 8 of the Periodic Table. More particularly, those metals include vanadium, chromium, manganese, iron, cobalt, nickel, niobium, tantalum, molybdenum, and tungsten which usually exist in the combination with oxides of other elements.

The apparatus, by which the process of this invention is preferably performed, includes a prereducer 1 (FIG. 1) and an arc heater 3. The apparatus of this invention also includes other apparatus such as a metal holding furnace 9, conduits 11, 13, 15, 17 and 19, a cyclone separator 23, and a heat exchanger 25.

The prereducer 1 is a gas-solid rector which is usually operated at an elevated temperature, such as a packed bed, spouted bed, rotary kiln, multiple hearth furnace, or a fluidized bed. The prereducer 1 is preferably a fluidized bed having a hopper 21 by which ground or pulverized ore 27 is introduced into the fluidized bed or prereducer 1 through a screw conveyor 28. Expended gas leaves the prereducer 1 through the cyclone separator 23 and the heat exchanger 25 to heat the incoming methane ($CH_4$) and then through an off gas vent 26. Fine particles of ore 27 and of partially reduced oxides are carried with exhaust gases ($CO$, $CO_2$, $H_2$, $H_2O$, $N_2$) to the separator from where the fine particles are carried through a conduit 16 for the preheated methane on its way to the arc heater 3.

Within the fluidized bed 1 the ore 27 is preheated and prereduced from an oxide form having a relatively higher valence state to a lower valence state, such as, for example, as shown in the following formulae (1–3) in which it is recognized that thermodynamic equilibrium dictates the stoichiometric gas ratios:

$$Fe_2O_3 + CO + H_2 \rightarrow Fe_3O_4 + CO_2 + H_2O \quad (1)$$

$$Fe_3O_4 + CO + H_2 \rightarrow FeO + Fe + CO_2 + H_2O \quad (2)$$

$$FeO + CO + H_2 \rightarrow Fe + CO_2 + H_2O \quad (3)$$

The solid products of reduction, such as the oxides of lower valence of iron as well as some metallic iron, leave the fluidized bed 1 through the conduit 17 having a rotary lock hopper 18 to the arc heater 3. Simultaneously the hot metallic oxides move through the conduit 15 with the preheated methane.

The arc heater 3, being the second step of the overall process of this invention, is the stage where the final reduction of ore or oxide occurs. The arc heater 3 is similar in construction and operation to that disclosed in the U.S. Pat. No. 3,765,870. Because of the full disclosure in that patent the description of the arc heater 3 is limited herein to the basic structure and operation. The arc heater 3 (FIG. 2) is a single-phase, self-stabilizing A.C. device capable of power levels up to about 3500 kilowatts or up to 10,000 kilowatts for a three-phase plant installation. For the practice of this invention it is preferred that three arc heaters 3 be provided, one for each of the three phases of the A.C. power supply. Two arc heaters 3 are shown in FIG. 1.

Figure 2:
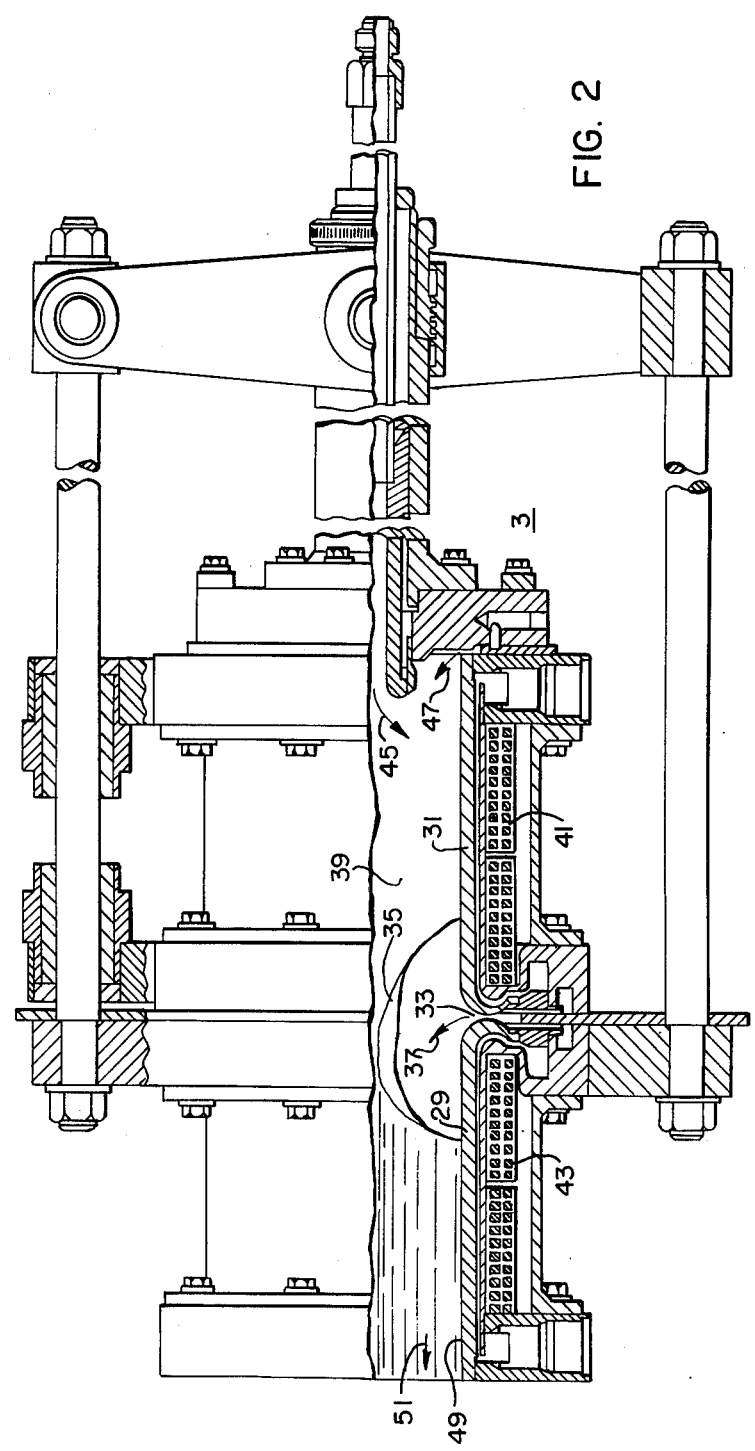
FIG. 2 is an elevational view, partially in section, of an arc heater.

As shown in FIG. 2 the arc heaters 3 have two annular copper electrodes 29, 31 which are spaced at 33 about 1 millimeter apart to accommodate the line frequency power source of about 4 kV. An arc 35 occurs in the space 33 and incoming feed stock gas 37 immediately blows the arc 35 from the space into the interior of the arc chamber 39. The arc 35 rotates at a speed of about 1000 revolutions per second by interaction of the arc current (several thousand amps AC) with a DC magnetic field set up by internally mounted solenoid coils 41, 43. The velocities yield a very high operating efficiency for equipment of this type. In addition to the feed stock gas 37, a secondary feed stock can be introduced at 45 (axially into the chamber 39 as well as at 47). Exit enthalpies ranging, for example, up to about 15,000 BTU per pound when operated on methane are easily obtained at good thermal efficiencies at the exit end 49 of the arc chamber 39. The feed stock gas 37, 45, 47 is a carbon-bearing reductant, such as mathane, natural gas, or other hydrocarbons.

Additional gas is preferably injected at 53 (FIG. 1) to carry the preheated and prereduced ore 27 from the injector through the conduit 15 and into a manifold 55 where the ore 27 enters the second stage of the process, and in which the ore is reduced from an oxide form to the pure metal such as iron. The temperature range for the second step of the reduction in the reactor 3 is from about 3000° F to 5000° F. The gaseous atmosphere in which the second step of the reduction occurs comprises hot reducing gases including hydrocarbons and their dissociation products which exist in sufficient quantities to reduce the desired metal oxides to the elemental metal which in turn moves through the conduit 17 to the metal holding furnace 9. Unreduced oxides in the previous steps form a slag 57 which accumulates on the surface of a metal body 59. Both slag 57 and metal 59 are drained periodically from the furnace 9 into appropriate receptacles.

In the metal holding furnace 9 excess reducing gases comprising carbon monoxide, and hydrogen from the conduit 17 pass through the upper portion of the furnace 9 and through the conduit 19 into the prereducer or fluidized bed 1.

The ores or oxides of several metals such as iron, chromium, manganese, nickel, vanadium, and the like, either alone or in combination, for example, as spinels, may be reduced to pure metals or alloys, such as ferroalloys, by the process of this invention, and the following examples are illustrative of the process of this invention:

EXAMPLE I

Figure 3:
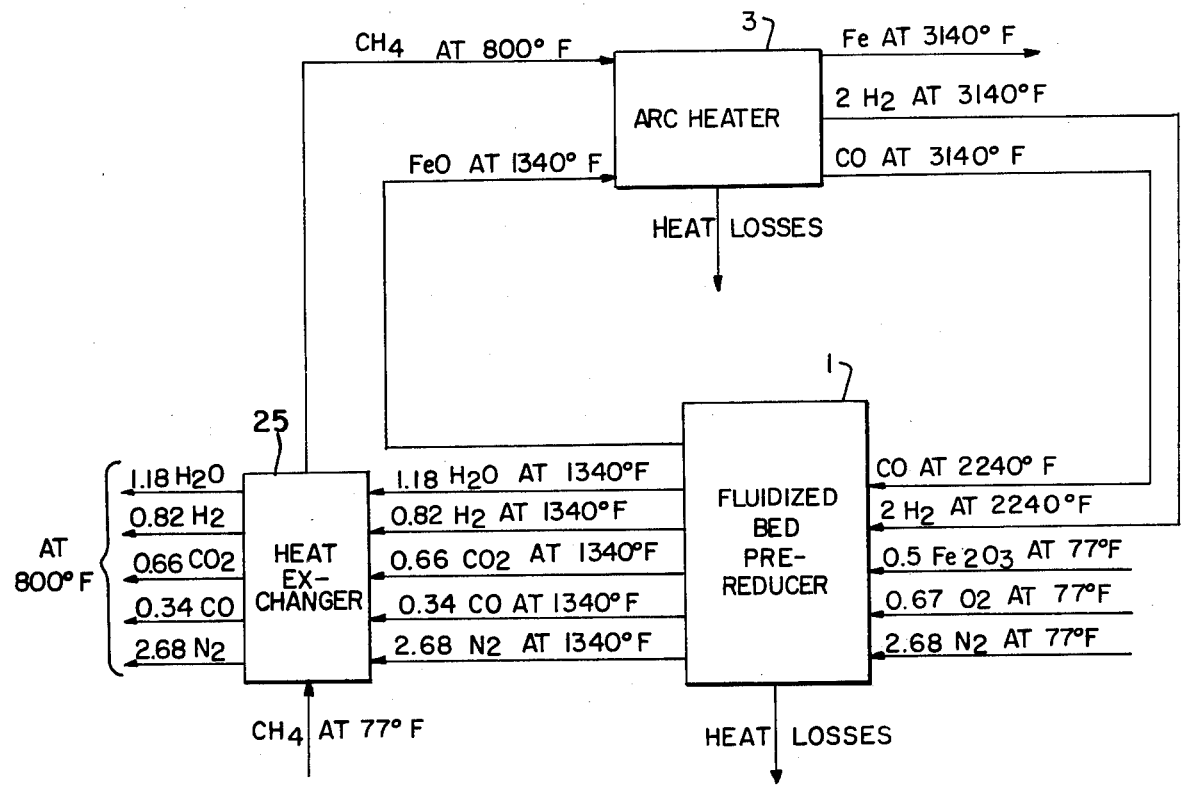
FIGS. 3 to 5 are diagrammatic views showing three examples for practicing this invention.

Elemental iron is produced in accordance with the formula (4):

$$FeO + CH_4 \rightarrow Fe + CO + 2H_2 \quad (4)$$

by the two-step process, i.e., prereduction and reduction as shown more particularly in FIG. 3. Iron oxide ($Fe_2O_3$) together with oxygen and nitrogen are introduced into the fluidized bed 1 at temperatures of about 77° F. In addition, carbon monoxide and hydrogen, both from the arc heater 3, are introduced into the fluidized bed at temperatures of about 2240° F. The resulting compounds leaving the fluidized bed at about 1340° F are iron oxide (FeO), water, hydrogen, carbon dioxide, carbon monoxide, nitrogen. All of those materials except iron oxide are delivered to the heat exchanger 25 for the purpose of preheating methane from a temperature 77° F to 800° F. In the arc heater 3 the iron oxide (FeO) and methane are combined to produce elemental iron as well as hydrogen and carbon monoxide, all at a temperature of approximately 3140° F.

A heat balance for the fluidized bed 1 is as follows:

TABLE I

| HEAT BALANCE | Kcals | |
|---|---|---|
| | Required | Available |
| Reaction at 1340° F | | −82 |
| 2H₂ from 2240° F to 1340° F | | −7 |
| CO from 2240° to 1340° F | | −4 |
| 0.5 Fe₂O₃ from 77° F to 1340° F | +12 | |
| 0.67 O₂ from 77° F to 1340° F | +4 | |
| 2.68 N₂ from 77° F to 1340° F | +14 | |
| | +30 | −93 |

Thus, there is more than enough heat available at step one of the process to take care of the process itself and any heat losses that could reasonably be expected. It is noted that the action in the fluidized bed 1 has been taken as far as the $CO/CO_2$ and $H_2/H_2O$ ratios that would be in equilibrium with FeO at 1340° F.

A heat balance for the heat exchanger 25 is shown in the following Table II:

TABLE II

| HEAT BALANCE | Kcals | |
|---|---|---|
| | Required | Available |
| 1.18 H₂O from 1340° F to 800° F | | −3 |
| 0.82 H₂ from 1340° F to 800° F | | −2 |
| 0.66 CO₂ from 1340° F to 800° F | | −2 |
| 0.34 CO from 1340° F to 800° F | | −1 |
| 2.68 N₂ from 1340° F to 800° F | | −6 |
| CH₄ from 77° F to 800° F | +5 | |
| | +5 | −14 |

Thus, there is more than enough heat available in the effluent gases from the fluidized bed for preheating the methane. After the gases leave the heat exchanger, credit could be taken for their calorific value.

A heat balance for the arc heater 3 is shown in Table III as follows:

TABLE III

| HEAT BALANCE | kcals Required |
|---|---|
| Reaction at 3140° F | +49 |
| FeO from 1340° F to 3140° F | +23 |
| $CH_4$ from 800° F to 3140° F | +25 |
| | +97 |

The heat required for the reaction in the arc heater 3 is manifestly obtained electrically.

The heat balance for the overall process indicates that the only energy input is at the arc heater stage. For the other stages there is more than enough heat available and the net energy requirement is 97 kcals/55.8g Fe, which is 3110 Btu/lb Fe, or 0.92 kWh/lb Fe.

The material balance for the overall process includes an $Fe_2O_3$ requirement of 1.43 lb/lb of Fe, and a $CH_4$ requirement of 0.29 lb/lb Fe.

In summary, it is possible to effect a savings of 41% in electric power and 33% in methane as compared with a process in which the entire reduction process is carried out in an arc heater without the fluidized bed prereducer.

EXAMPLE II

Figure 4:
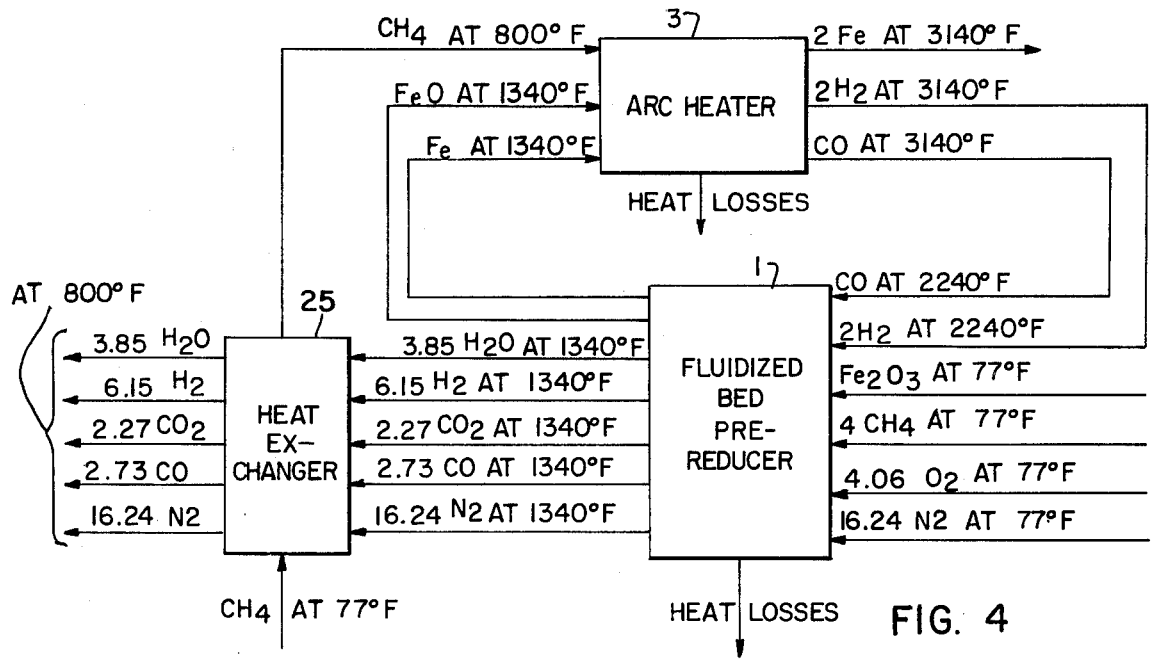

Iron is also produced by a slight variation of the process shown in Example 1. As shown in FIG. 4, carbon monoxide and hydrogen gas are introduced into the fluidized bed 1 at a temperature of 2240° F after leaving the arc heater 3. Iron oxide, methane, oxygen, and nitrogen are simultaneously introduced at about 77° F. The resulting gases include steam, hydrogen, carbon dioxide, carbon monoxide, and nitrogen which at 1340° F pass through the heat exchanger 25 for the purpose of preheating methane before it enters the arc heater 3. At the same time iron oxide (FeO) and iron leave the prereducer 1 and enter the arc heater at 1340° from which elemental iron, hydrogen, and carbon monoxide are delivered at a temperature of 3140° F.

A heat balance for the fluidized bed 1 is shown in Table IV as follows:

TABLE IV

| HEAT BALANCE | kcals | |
|---|---|---|
| | Required | Available |
| Reaction at 1340° F | | −273 |
| $2H_2$ from 2240° F to 1340° F | | −7 |
| CO from 2240° F to 1340° F | | −4 |
| $4CH_4$ from 77° F to 1340° F | +37 | |
| $Fe_2O_3$ from 77° F to 1340° F | +24 | |
| 4.06 $O_2$ from 77° F to 1340° F | +22 | |
| 16.24 $N_2$ from 77° F to 1340° C | +83 | |
| | +166 | −284 |

If the excess of heat evolved over the heat required should prove to be too small, (for example, if the $Fe_2O_3$ is very damp or very impure), the required heat could be reduced by preheating the incoming $CH_4$, air, and ore using the effluent gases from the fluidized bed. These gases have a vastly greater heat content than is needed for preheating the methane being fed to the arc heater. It should be noted that the reaction in the fluidized bed prereducer 1 has been taken as far as the $CO/CO_2$ and $H_2/H_2O$ ratios that would be in equilibrium with Fe/FeO at 1340° F. The heat balance for the heat exchanger 25 is indicated in Table V as follows:

TABLE V

| HEAT BALANCE | kcals | |
|---|---|---|
| | Required | Available |
| 3.85 $H_2O$ from 1340° F to 800° F | | −11 |
| 6.15 $H_2$ from 1340° F to 800° F | | −13 |
| 2.27 $CO_2$ from 1340° F to 800° F | | −9 |
| 2.73 CO from 1340° F to 800° F | | −6 |
| 16.24 $N_2$ from 1340° F to 800° F | | −37 |
| $CH_4$ from 77° F to 800° F | +4 | |
| | +4 | −76 |

As indicated in Table V there is a vast excess of heat available for preheating the methane. Some of the excess heat could be easily used to preheat the feed to the fluidized bed 1 if this should prove to be necessary.

The heat balance for the arc heater 3 is indicated in Table VI as follows:

TABLE VI

| HEAT BALANCE | kcals required |
|---|---|
| Reaction at 3140° F | +49 |
| $CH_4$ from 800° F to 3140° F | +25 |
| FeO from 1340° F to 3140° F | +23 |
| Fe from 1340° F to 3140° F | +14 |
| | +111 |

Here again heat losses were not taken into account for this part of the process. The heat balance for the overall process of Example II involves energy input at the arc heater stage where the net energy requirement is 111 kcals/111.6g of iron, which is 1785 Btu/lb, or 0.52 kWh/lb of iron. The material balance involves an $Fe_2O_3$ requirement of 1.43 lb/lb of iron and a methane ($CH_4$) requirement of 0.69 lb/lb of iron. Thus, there is a considerable savings in electric power (66%) compared with Example I. However, this is at the expense of an increased consumption of methane (61%). The process of this example might, therefore, be desirable in a part of the country where natural gas is relatively cheap but power is relatively expensive.

EXAMPLE III

The process of this Example involves the production of ferrochrome from chromite which is a commercially available ore. The reactions occur according to the formula:

$3Fe + 2.58Cr_2O_3 \cdot 2.3MgO \cdot 1.33Al_2O_3 \cdot 0.14SiO_2 \rightarrow$
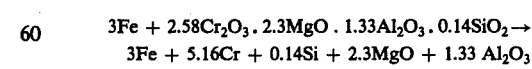

Figure 5:
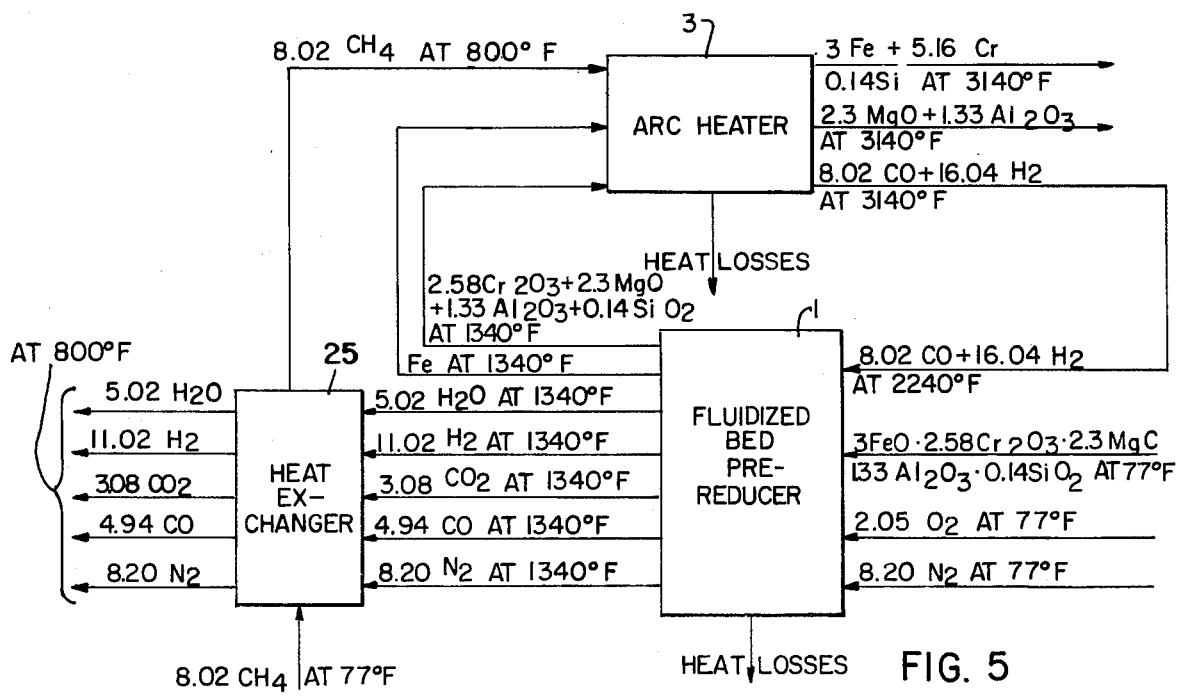

Here again it is shown that if prereducing and preheating stages are introduced, considerable savings in both power and methane can be achieved compared with the process where all the desired reduction is effected in the arc heater. As shown in FIG. 5 carbon monoxide and hydrogen gas having been preheated to 2240° F, are introduced into the fluidized bed 1 to prereduce and preheat a mixture of oxides or iron, chromium, magnesium, aluminum and silicon entering at a temperature of 77° F. Oxygen and nitrogen are also introduced at the same temperature. The resulting gases including steam, hydrogen, carbon dioxide, carbon monoxide, and nitrogen leaving the fluidized bed 1 at 1340° F are introduced into the heat exchanger 25 in order to preheat the methane which subsequently enters the arc heater at a temperature of 800° F. From the fluidized bed 1 reduced iron as well as the oxides of the indicated materials enter the arc heater at a temperature of approximately 1340° F from which they emerged as elemental iron, chromium, and silicon at a temperature of 3140° F. In addition oxides of magnesium and aluminum, are also eliminated as slag 57 at an excess of carbon monoxide and hydrogen at 3140° F are available for reintroduction into the fluidized bed prereducer 1.

The heat balance for the fluidized bed prereducer is indicated in Table VII as follows:

TABLE VII

HEAT BALANCE

| | kcals | |
|---|---|---|
| | Required | Available |
| Reaction at 1340° F | | −316 |
| 16.04$H_2$ from 2240° F to 1340° F | | −60 |
| 8.02CO from 2240° F to 1340° F | | −33 |
| 3FeO from 77° F to 1340° F | +26 | |
| 2.58$Cr_2O_3$ from 77° F to 1340° F | +52 | |
| 2.3MgO from 77° F to 1340° F | +17 | |
| 1.33$Al_2O_3$ from 77° F to 1340° F | +25 | |
| 0.14$SiO_2$ from 77° F to 1340° F | +2 | |
| 2.05$O_2$ from 77° F to 1340° F | +111 | |
| 8.20$N_2$ from 77° F to 1340° F | +42 | |
| | +175 | −409 |

As shown there is a sufficiently large excess of heat available over the heat required. The H2/H2O and CO/CO2 ratios in the effluent gas are those that would be in equilibrium with iron. Gases with those ratios would not be significantly reducing to any of the other oxides.

The heat balance for the heat exchanger 25 is shown in Table VIII as follows:

TABLE VIII

HEAT BALANCE

| | Kcals | |
|---|---|---|
| | Required | Available |
| 5.02$H_2O$ from 1340° F to 800° F | | −14 |
| 11.02$H_2$ from 1340° F to 800° F | | −24 |
| 3.08$CO_2$ from 1340° F to 800° F | | −12 |
| 4.94CO from 1340° F to 800° F | | −11 |
| 8.20$N_2$ from 1340° F to 800° F | | −19 |
| 8.02$CH_4$ from 77° F to 800° F | +36 | |
| | +36 | −80 |

As shown in Table VIII there is more than enough heat available.

The heat balance for the arc heater 3 is shown in Table IX as follows:

TABLE IX

HEAT BALANCE

| | kcals | |
|---|---|---|
| | Required | Available |
| Reaction at 3140° F | +677 | |
| 8.02$CH_4$ from 800° F | +201 | |
| 3Fe from 1340° F to 3140° F | +42 | |
| 2.58$Cr_2O_3$ from 1340° F to 3140° F | +64 | |
| 2.3MgO from 1340° F | +29 | |
| 1.33$Al_2O_3$ from 1340° F to 3140° F | +41 | |
| 0.14$SiO_2$ from 1340° F to 3140° F | +3 | |

TABLE IX-continued

HEAT BALANCE

| | kcals | |
|---|---|---|
| | Required | Available |
| +1057 | | |

As in the previous example the heat losses have not been taken into account for this part of the process.

The heat balance for the overall process of Example III involves a heat input only at the arc heater stage. At all the other stages there is enough energy available. The net energy requirement is 1057 kcals/435.5 lbs alloy, which is 4360 Btu/lb of alloy, or 1.28 kWh/lb of alloy. The materials balance for the overall process indicates an ore requirement of 1.64 lb/lb of alloy and a methane requirement of 0.30 lb/lb of alloy.

As was shown in the iron ore reduction, considerable savings can be effected in the cost of electric power and natural gas by prereduction. These amount to 29% in electricity and 25% in natural gas.

In conclusion, the precise manner in which the whole process is conducted is dependent upon the local economics, particularly on the relative costs of reductant, methane, and electric power. In Examples I and II iron ore is reduced to iron to achieve considerable savings of both electric power and methane requirements. Depending upon circumstances, the Example II indicates a greater savings in electric power at the expense of greater methane consumption. It is emphasized that the processes described here are not optimized processes. They are given only as Examples of the sort of savings that could be achieved if the heat content and reducing power of the waste gases from the arc heater reduction are taken advantage of. In particular, it should be emphasized that the reduction of chromites (Example III) was chosen for illustrative purposes only. It is recognized that many other metallic ores can be reduced by the process disclosed herein.

What is claimed is:

1. In a process for producing a metal or an alloy comprising the steps of
   a. partially reducing in an initially fresh supply of reducing gas in a gas-solid reactor at least one metallic oxide and other metallic compounds from a relatively higher valence state to an intermediate product of a lower valence state that is mixed with a quantity of exhaust gases,
   b. conducting the exhaust gases through a heat exchanger to preheat a second supply of reducing gas,
   c. striking an electric arc in an axial gap between generally tubular electrodes spaced along a common axis to provide an arc heated stream,
   d. introducing a feed stock carbon-bearing reductant through the axial gap to provide a reducing atmosphere in the arc heated stream,
   e. feeding the intermediate product of partially reduced metallic oxide and compounds and preheated second supply of reducing gas into the arc heated stream in an amount in excess of that required to reduce the metallic oxide and compounds from the lower valence state to substantially pure elemental metal, and
   f. recirculating to step (a) the unused excess reducing gas or derivative thereof to assist with the fresh supply of reducing gas in the partial reduction.

2. The process of claim 1 in which step (a) occurs in a fluidized bed.

3. The process of claim 1 in which the reducing gas is a hydrocarbon.

4. The process of claim 1 in which the reducing gas is methane.

5. The process of claim 1 in which the derivatives of the reducing gas include CO and $H_2$.

* * * * *